(12) United States Patent
Hirose et al.

(10) Patent No.: US 10,479,407 B2
(45) Date of Patent: Nov. 19, 2019

(54) METAL PIPE AND STRUCTURAL MEMBER USING METAL PIPE FOR VEHICLE

(71) Applicant: NIPPON STEEL & SUMITOMO METAL CORPORATION, Tokyo (JP)

(72) Inventors: Satoshi Hirose, Tokyo (JP); Yuichi Ishimori, Tokyo (JP); Hiroshi Fukuchi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/301,780

(22) PCT Filed: Jun. 5, 2017

(86) PCT No.: PCT/JP2017/020878
§ 371 (c)(1),
(2) Date: Nov. 15, 2018

(87) PCT Pub. No.: WO2017/213104
PCT Pub. Date: Dec. 14, 2017

(65) Prior Publication Data
US 2019/0152528 A1    May 23, 2019

(30) Foreign Application Priority Data

Jun. 7, 2016 (JP) ................... 2016-113823

(51) Int. Cl.
*B62D 21/15* (2006.01)
*B60R 19/04* (2006.01)
(Continued)

(52) U.S. Cl.
CPC .............. *B62D 21/15* (2013.01); *B60R 19/04* (2013.01); *B62D 21/08* (2013.01); *B62D 23/005* (2013.01);
(Continued)

(58) Field of Classification Search
CPC .. B60J 5/04; B60J 5/042; B60J 5/0443; B60R 19/02; B60R 19/18; B62D 21/02; B62D 21/15; B62D 21/157; C21D 9/08
(Continued)

(56) References Cited

U.S. PATENT DOCUMENTS 5,584,510 A * 12/1996 Thuliez ................... B62D 21/02
                                                                280/784
6,296,299 B1 * 10/2001 Hanakawa ............. B60J 5/0443
                                                                293/109
(Continued)

FOREIGN PATENT DOCUMENTS

JP    2001-520601    10/2001
JP    2010-236560    10/2010
(Continued)

*Primary Examiner* — Jason S Daniels
(74) *Attorney, Agent, or Firm* — Clark & Brody

(57) ABSTRACT

A metal pipe includes a pair of side walls facing each other and having a height H, a top portion connected to an upper edge of each of the pair of side walls, and a bottom portion connected to a lower edge of each of the pair of side walls. The metal pipe has a length six times the height H of the side walls or more. Each side wall pair includes a high-strength portion and a pair of low-strength portions, the low strength portions sandwiching the high strength portion. A high-strength portion dimension is not less than ⅔H and not more than 3H as measured longitudinally of the metal pipe, the high-strength portions forming opposite portions of the side wall pairs. The low-strength portion yield strength is 60 to 85% of that of the high-strength portion, whose yield strength is not less than 500 MPa.

9 Claims, 14 Drawing Sheets

(51) Int. Cl.
*B62D 23/00* (2006.01)
*B62D 29/00* (2006.01)
*B62D 21/08* (2006.01)
*C21D 9/08* (2006.01)

(52) U.S. Cl.
CPC .............. *B62D 29/007* (2013.01); *C21D 9/08* (2013.01); *C21D 2221/00* (2013.01)

(58) Field of Classification Search
USPC ..... 296/146.6, 187.09, 187.12; 293/121, 122
See application file for complete search history.

(56) References Cited

U.S. PATENT DOCUMENTS

2016/0368536 A1* 12/2016 Cazes .................. C21D 9/0068
2018/0126934 A1*  5/2018 Nagayama .............. B60R 19/04

FOREIGN PATENT DOCUMENTS

| JP | 2011-037313 | 2/2011 |
|----|-------------|--------|
| JP | 5137322 | 2/2013 |
| JP | 2013-052871 | 3/2013 |
| JP | 2014-024074 | 2/2014 |
| WO | 2005/058624 | 6/2005 |

\* cited by examiner

METAL PIPE AND STRUCTURAL MEMBER USING METAL PIPE FOR VEHICLE

TECHNICAL FIELD

The present invention relates to an impact-resistant metal pipe and a structural member for a vehicle using such a metal pipe.

BACKGROUND ART

Metal pipe having a quadrangular cross section, i.e. quadrangular pipe, is used in various applications. For example, quadrangular pipe is used as a structural member in a vehicle, a building, or a large container. Such structural members are required to have resistance against impact, or impact resistance.

For example, WO 2005/058624 (Patent Document 1) discloses a metal pipe to be mounted on the vehicle body of an automobile with both ends supported thereon to provide impact resistance. This metal pipe has a bent portion that runs its entire length or just a portion of its length. The metal pipe is disposed such that the outer side of the bent portion is generally oriented toward the direction of a possible impact applied to the vehicle body. This metal pipe has better impact resistance than a reinforcement member made of straight pipe to reinforce the vehicle body.

PRIOR ART DOCUMENTS

Patent Documents

Patent Document 1: WO 2005/058624

SUMMARY OF THE INVENTION

Problems to be Solved by the Invention

When a metal pipe receives an impact exceeding its yield strength, it is bent sharply such that the sharply bent portion protrudes. As the wall thickness of the metal pipe is reduced to reduce weight, an extent of protrusion occurring when the pipe is sharply bent by an impact tends to increase. If the metal pipe is used as a structural member, for example, it is preferable to reduce the extent of protrusion occurring when the metal pipe receives an impact from a collision and is sharply bent.

In view of this, the present application discloses a metal pipe that protrudes to a reduced extent when it is deformed by impact, and a structural member using such a metal pipe.

Means for Solving the Problems

A metal pipe according to an embodiment of the present invention is a metal pipe having a quadrangular cross section and a length not less than 6 H. The metal pipe includes a pair of side walls facing each other and having a height H, a top portion connected to an upper edge of each of the pair of side walls, and a bottom portion connected to a lower edge of each of the pair of side walls. Each of the pair of side walls includes a high-strength portion and a pair of low-strength portions. Each high-strength portion has a dimension not less than (⅔) H and not more than 3 H as measured in a longitudinal direction of the metal pipe, and the high-strength portions form opposite portions of the pair of side walls, each high-strength portion having a yield strength not less than 500 MPa. The low-strength portions sandwich the high-strength portion as determined along the longitudinal direction of the metal pipe, each low-strength portion having a yield strength of 60 to 85% of that of the high-strength portion.

Effects of the Invention

The present disclosure provides a metal pipe that protrudes to a reduced extent when it is deformed by an impact, and a structural member using such a metal pipe.

EMBODIMENTS FOR CARRYING OUT THE INVENTION

Figure 1A:
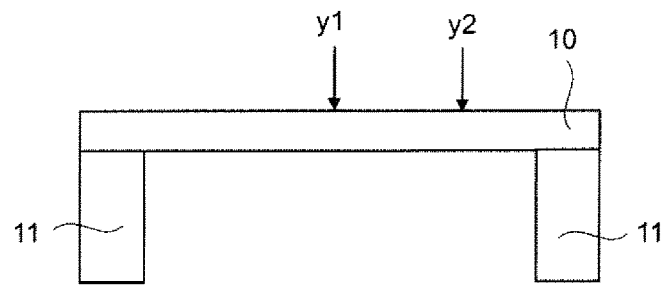
FIG. 1A shows an exemplary construction of a quadrangular pipe with its both ends supported.

The inventors investigated a behavior of a quadrangular pipe used as a structural member against an impact. If the quadrangular pipe is used as a structural member, the quadrangular pipe forms a part of a structure (for example, a vehicle, building or container) with its both ends supported, as shown in FIG. 1A, for example. The inventors examined the behavior of a quadrangular pipe with supported ends against an impact and found that the extent of deformation caused by an impact may become significant when the longitudinal dimension (or length) of the quadrangular pipe is about six times, or larger, the dimension of the quadrangular pipe as measured in the direction in which an impact is applied.

Figure 1B:
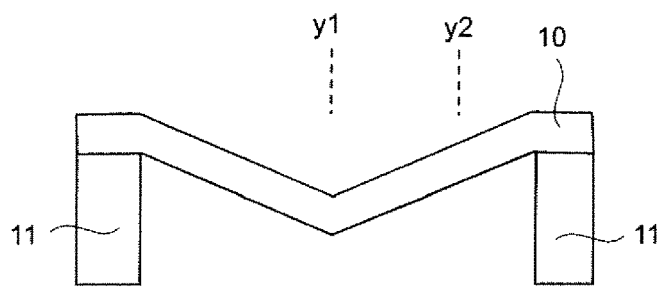
FIG. 1B shows an exemplary deformation behavior of the quadrangular pipe of FIG. 1A.
Figure 1C:
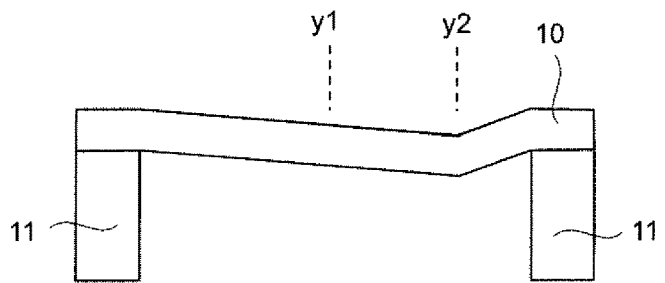
FIG. 1C shows another exemplary deformation behavior of the quadrangular pipe of FIG. 1A.

For example, when an impact is applied to the middle (y1 in FIG. 1A), as determined along the longitudinal direction, of a quadrangular pipe with its both ends supported, the quadrangular pipe is deformed and sharply bent early after the impact (see FIG. 1B). The quadrangular pipe is also deformed when an impact has been applied to a position (y2 in FIG. 1A) between the middle of the quadrangular pipe along the longitudinal direction and one supported portion (see FIG. 1C). The extent of protrusion of an early sharp bend found when an impact is applied to the middle of the quadrangular pipe along the longitudinal direction (y1) is larger than that found when an impact is applied to y2. An analysis demonstrated that the load of a moment is highest when an impact is applied to the middle, along the longitudinal direction, of a quadrangular pipe with its both ends supported.

The inventors did research to reduce the extent of deformation of a quadrangular pipe caused by an impact by increasing the strength of the quadrangular pipe. However, the extent of protrusion associated with deformation does not change even when the strength of the quadrangular pipe is increased. In view of this, the inventors did further research to prevent sharp bending by changing the strength distribution in the quadrangular pipe.

The inventors extensively investigated the material strength of and strength distribution in a quadrangular pipe, and arrived at an arrangement in which each side wall of the quadrangular pipe has low-strength portions with a lower strength than other portions, the low-strength portions being arranged in the longitudinal direction. That is, the inventors arrived at an arrangement in which low-strength portions with a lower strength than a high-strength portion is disposed to sandwich the high-strength portion. The inventors found that, in this arrangement, a load derived from an impact applied to the high-strength portion is transmitted to the low-strength portions to prevent sharp-bend deformation. Then, after further trials and errors, the inventors found that the extent of deformation caused by an impact against the high-strength portion can be effectively reduced by optimizing the strength of the high-strength portion, the strength ratio of the low-strength portions to the high-strength portion, and the longitudinal dimension of the high-strength portion. Based on these findings, the inventors arrived at the quadrangular pipe of the embodiment described below.

EMBODIMENTS

Figure 2A:
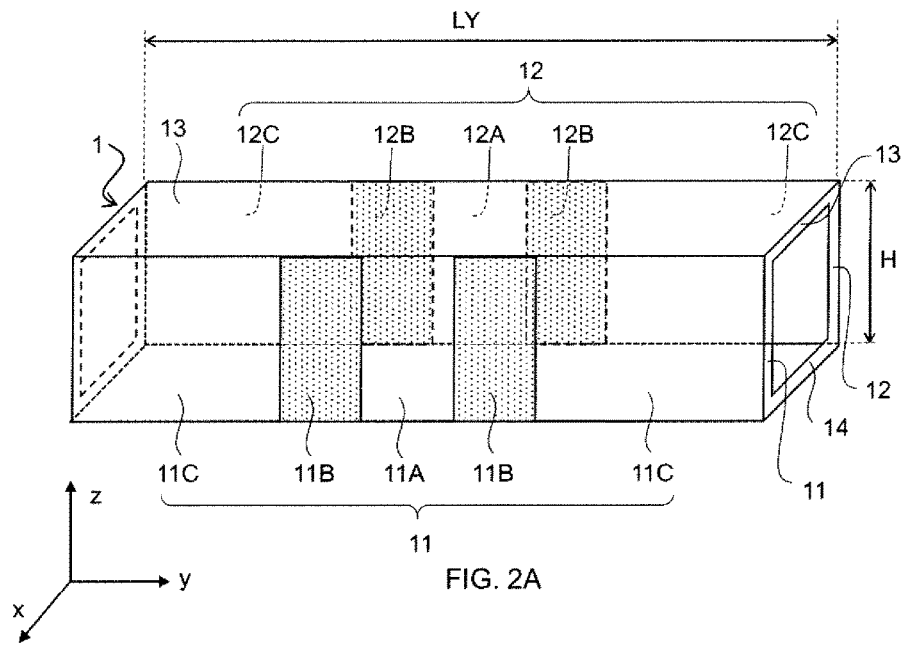
FIG. 2A is a perspective view of the construction of a metal pipe according to the present embodiment.
Figure 2B:
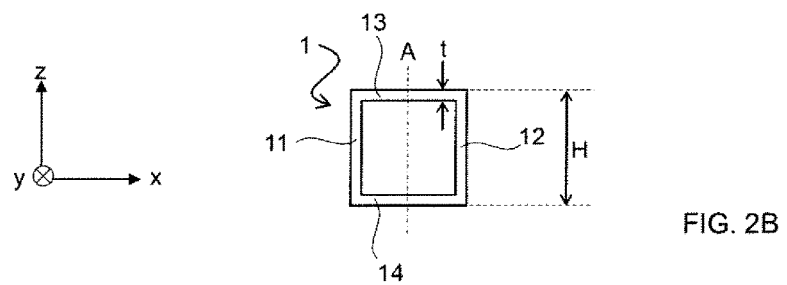
FIG. 2B is a side view of the metal pipe of FIG. 2A as viewed in the y-direction.
Figure 2C:
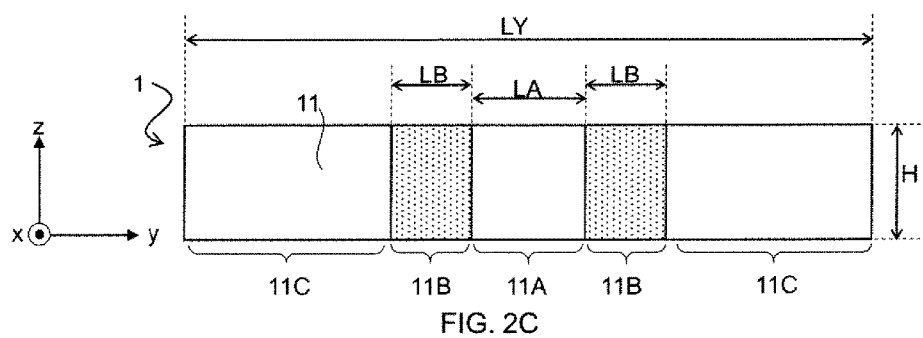
FIG. 2C is a side view of the metal pipe of FIG. 2A as viewed in the x-direction.

FIG. 2A is a perspective view of the construction of a metal pipe 1 according to the present embodiment. FIG. 2B is a side view of the metal pipe 1 of FIG. 2A as viewed in the longitudinal direction (i.e. y-direction). FIG. 2C is a side view of the metal pipe 1 of FIG. 2A as viewed in a direction perpendicular to the longitudinal direction (i.e. x-direction).

As shown in FIGS. 2A and 2B, the metal pipe 1 is a quadrangular pipe having a quadrangular cross section. The metal pipe 1 includes a pair of side walls 11 and 12 that face each other, a top portion 13 connected to the upper edges of the pair of side walls 11 and 12, and a bottom portion 14 connected to the lower edges of the pair of side wall 11 and 12. The length LY of the metal pipe 1 is six times the height H of the side walls 11 and 12 or larger, i.e. 6 H or larger (LY≥6 H). In the implementation shown in FIGS. 2A and 2B, the pair of side walls 11 and 12 have the same height (H). If the side walls 11 and 12 have different heights, H is defined as the height of the higher one of the side walls 11 and 12, and the length LY of the metal pipe 1 is six times H or larger.

Each of the side walls 11 and 12 includes a high-strength portion 11A or 12A and low-strength portions 11B or 12B. The high-strength portions 11A and 12A are provided by opposite portions of the side walls 11 and 12. That is, the high-strength portion 11A of one side wall 11 is located to be opposite to the high-strength portion 12A of the other side wall 12. The low-strength portions 11B and 12A are provided by opposite portions of the side walls 11 and 12. That is, the low-strength portions 11B of one side wall 11 are opposite to the low-strength portions 12B of the other side wall 12.

As shown in FIG. 2C, the dimension of each of the opposite high-strength portions 11A and 12A as measured in the longitudinal direction of the metal pipe, LA, is not less than (⅔)H and not more than 3 H (2 H/3≤LA≤3 H). The high-strength portions 11A and 12A have a yield strength not less than 500 MPa (or a tensile strength not less than 980 MPa). For each side wall, the low-strength portions 11B or 12B sandwich the high-strength portion 11A or 12A as determined along the longitudinal direction of the metal pipe. The yield strength of the low-strength portions 11B and 12B is 60 to 85% (not less than 60% and not more than 85%) of that of the high-strength portions 11A and 12A. Similarly, the tensile strength of the low-strength portions 11B and 12B is 60 to 85% of the tensile strength of the high-strength portions 11A and 12A.

Each high-strength portion 11A and 12A extends a distance not less than (⅔)H and not more than 3 H as measured in the longitudinal direction of the metal pipe. If the side walls 11 and 12 have different heights, H is defined by the height of the higher one of the side walls 11 and 12 and the dimension of the high-strength portion 11A or 12A as measured in the longitudinal direction of the metal pipe 1 is not less than (⅔)H and not more than 3 H.

The portions 11C or 12C of each side wall 11 or 12 that are other than the high-strength portion 11A or 12A and low-strength portions 11B or 12B, i.e. the portions 11C or 12C located outward of the low-strength portions 11B or 12B, have yield strengths not lower than those of the low-strength portions 11B or 12B. For example, the portions 11C or 12C located outward of the low-strength portions 11B or 12B may have a yield strength equal to that of the high-strength portion 11A or 12A. In the present implementation, the low-strength portions 11B and 12B are portions with lower yield strengths than the surrounding portions.

As shown in FIGS. 2A to 2C, the low-strength portions 11B and 12B are positioned on the pair of side walls 11 and 12 supporting the top portion 13 which may receive an impact load such that the low-strength portions for each side wall sandwich the associated high-strength portion 11A or 12A, thereby preventing the deformation caused by the impact load from being concentrated on the high-strength portion 11A or 12A and dispersing the deformation to the low-strength portions 11B or 12B. This is achieved by the following three features: First, the high-strength portions 11A and 12A have a yield strength not less than 500 MPa (or a tensile strength not less than 980 MPa). Second, the strength ratio of the low-strength portions 11B and 12B to the high-strength portions 11A and 12A is 60 to 85%. Third, the dimension LA of each of the opposite high-strength portions 11A and 12A as measured in the longitudinal direction of the metal pipe 1 is not less than (⅔)H and not more than 3 H. These three features allow the deformation caused by an impact load applied to a high-strength portion 11A or 12A to be diffused early to the low-strength portions 11B or 12B. This will prevent sharp-bend deformation of the metal pipe 1 after an impact.

An investigation by the inventors revealed that, in an elongated metal pipe with a length LY of 6D or more, such as the metal pipe 1, supported at two supported portions separated in the longitudinal direction, the bending moment generated at and near the middle between the two supported portions of the metal pipe is largest when an impact has been applied to or near the middle between the two supported portions. In view of this finding, the high-strength portions 11A and 12A may be positioned at or near the middle between the two supported portions and the low-strength portions 11B or 12B may be positioned to sandwich the associated high-strength portions 11A and 12A to prevent the middle portion of the metal pipe 1 from being sharply bent by an impact. When an impact is applied to a position on the metal pipe near a supported portion, the load from the bending moment is not as large as when an impact is applied to the middle. Thus, the metal pipe is less likely to be sharply bent when an impact is applied to a position closer to a supported portion than the middle between the two supported portions than when an impact with the same strength is applied to the middle. As such, the strength distribution in the metal pipe at and near the middle between the two supported portions is important. The strength distribution in the metal pipe near the supported portions is less important than that at and near the middle between the two supported portions.

Figure 3:
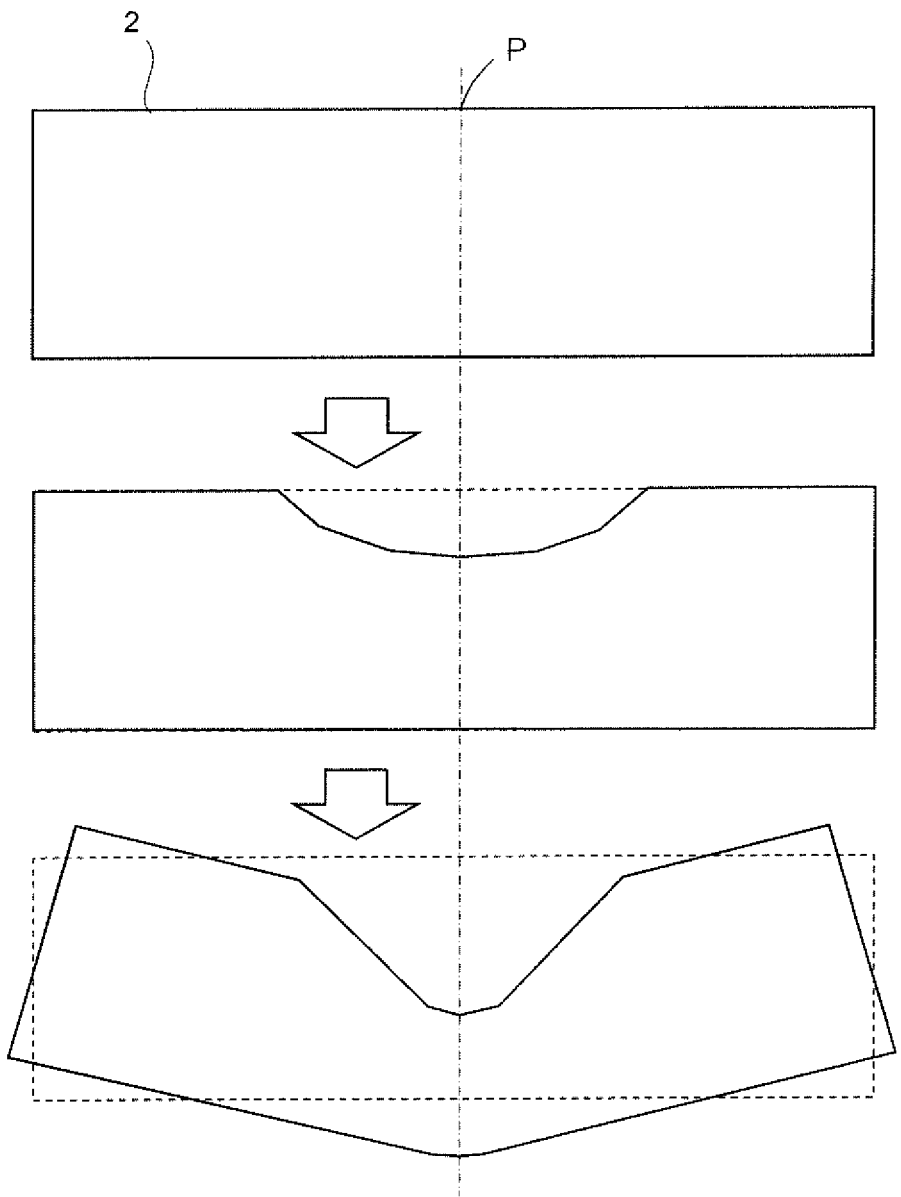
FIG. 3 illustrates the deformation behavior of a metal pipe with a uniform strength distribution.
Figure 4:
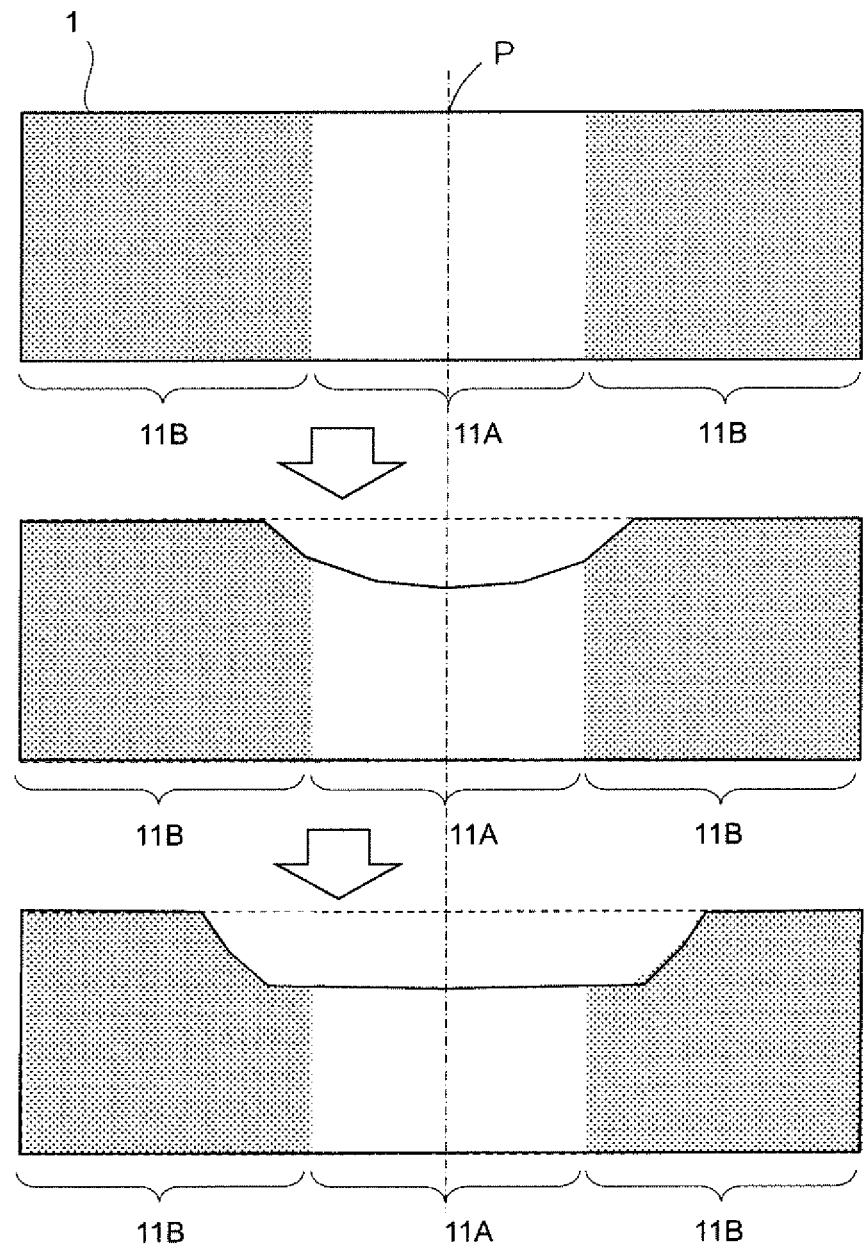
FIG. 4 illustrates the deformation behavior of a metal pipe having low-strength portions sandwiching a high-strength portion.

FIG. 3 illustrates the deformation behavior of a metal pipe 2 having a quadrangular cross section with a uniform strength distribution. FIG. 4 illustrates the deformation behavior of the metal pipe 1, which includes the low-strength portions 11B or 12B shown in FIGS. 2A to 2C. FIGS. 3 and 4 each show the deformation behavior of the respective metal pipe found when an indenter has been caused to hit the pipe in a direction perpendicular to the longitudinal direction of the pipe. FIGS. 3 and 4 each show the structure of a side of the metal pipe as viewed in a direction perpendicular to the direction of the impact of the indenter and the longitudinal direction of the metal pipe.

As shown in FIG. 3, in the metal pipe 2 having a uniform strength distribution, an impact may cause deformation at the bending deformation initiation point P, which proceeds in a wedge shape as viewed from a side. As a result, the metal pipe 2 is bent to protrude sharply in the bending direction (i.e. direction of the impact). In some cases, the metal pipe 2 may develop a crack.

As shown in FIG. 4, in the metal pipe 1 including the low-strength portions 11B (dotted in FIG. 4) sandwiching the high-strength portion 11A, deformation proceeding inward from the bending deformation initiation point P on the high-strength portion 11A, when reaching the border between the high-strength portion 11A and a low-strength portion 11B, is likely to proceed in a horizontal direction (i.e. longitudinal direction of the metal pipe 1), which provides a relatively low strength. As such, the deformation expands in the longitudinal direction, and the extent of deformation in the bend direction (i.e. impact direction) is small.

The deformation behaviors shown in FIGS. 3 and 4 are not limited to cases where an indenter has been caused to hit a metal pipe. Similar deformation behaviors may be produced when, for example, a metal pipe is bent by an axial force that compresses the metal pipe in the longitudinal direction or when a metal pipe is bent when an indenter is pressed against the pipe to apply a static force in a direction perpendicular to the longitudinal direction, as in a three-point bending test.

The metal pipe 1 may be used as a structural member. For example, a structural member may be formed by a metal pipe 1 supported at two distant locations as determined along the longitudinal direction of the metal pipe 1. In such cases, the metal pipe 1 has two connections to be connected to another member. That is, the metal pipe 1 is supported by another member at the connections. The connections may also be referred to as supported portions. The connections are positioned on at least one of the side walls 11 and 12, top portion 13 and bottom portion 14.

The metal pipe 1 is fixed to the other member via the connections. That is, the metal pipe 1 is connected to the other member via the connections so as to be unmovable relative to each other. The connections of the metal pipe 1 are joined to the other member by means of fastening members or by welding, for example. Three or more connections may be provided.

The two connections are located at positions distant by not less than 6 H as measured in the longitudinal direction of the metal pipe 1. That is, the distance between the two connections is not less than 6 H. The high-strength portions 11A and 12A and low-strength portions 11B and 12B are located between the two connections. In this arrangement, when an impact is applied between the two connections, the extent of protrusion caused by the resulting deformation of the metal pipe 1 will be smaller.

For example, when the metal pipe 1 is used as a structural member for a vehicle, the metal pipe 1 may be attached to the vehicle where the metal pipe 1 is supported by two connections separated in the longitudinal direction of the metal pipe. Here, the metal pipe 1 may be attached to the vehicle where the top portion 13 is located on the outside of the vehicle and the bottom portion 14 is located toward the interior of the vehicle. Thus, when the metal pipe 1 receives an impact from outside the vehicle, the extent of the protrusion resulting from the metal pipe being sharply bent toward the interior of the vehicle will be smaller.

In the metal pipe 1 shown in FIGS. 2A to 2C, the longitudinal direction LA of each high-strength portion 11A or 12A is preferably not less than H and not more than 3 H, where H is the height of the side walls 11 and 12 (H≤LA≤3 H). This will further reduce the extent of deformation caused by an impact against a high-strength portion 11A or 12B. Further, the dimension LA is preferably not less than H and not more than (4/3)H (H≤LA≤(4/3)H). This will further reduce the extent of deformation caused by an impact.

The longitudinal dimension LB of each low-strength portion 11B or 12B is preferably not less than (3/5)H ((3/5)H≤LB). This will further reduce the extent of deformation caused by an impact against a high-strength portion 11A. The dimension LB of each low-strength portion 11B is preferably not more than 2H, for example, and more preferably not more than H to provide a certain strength to the metal pipe 1.

The dimension LA of the high-strength portions and the dimension LB of the low-strength portions relative to the height H of the side walls is not limited to the above-discussed relationships, i.e. cases where $((2/3)H \leq LA \leq 3 H)$, or more preferably $(H \leq LA \leq (4/3)H)$, or yet more preferably $(H \leq LA \leq (4/3)H)$ or $((3/5)H \leq LB)$, for example, is strictly satisfied. Cases with errors that allow one to deem the dimensions satisfying the above-discussed relationships are also contemplated. Further, the length LY of the metal pipe 1 relative to the height H of the side walls is not limited to cases where the above-mentioned relationship, i.e. $(6 H \leq LY)$, is not strictly satisfied. A metal pipe with a length about six times the height H of the side walls may be deemed to be a metal pipe having the above-mentioned relationship $(6 H \leq LY)$.

Further, in the implementation shown in FIGS. 2A to 2C, the border between a low-strength portion 11B and the high-strength portion 11A and the border between a low-strength portion 12B and the high-strength portion 12A extend along lines perpendicular to the longitudinal direction of the metal pipe. The border between a low-strength portion and a high-strength portion is not limited to this implementation. For example, instead of being perpendicular to the longitudinal direction of the metal pipe, the border between a low-strength portion and a high-strength portion may meander. In such implementations, the border between a low-strength portion and a high-strength portion is deemed to be located in the middle between the position on the meandering border that is furthest into the low-strength portion and the position that is furthest into the high-strength portion.

The high-strength portions 11A and 12A are preferably positioned in the middle of the metal pipe 1 as determined along the longitudinal direction. That is, at least a portion of each high-strength portion 11A or 12A is preferably positioned in the middle of the metal pipe 1 as determined along the longitudinal direction. In other words, a central portion of the metal pipe 1 as determined along the longitudinal direction preferably forms the high-strength portions 11A and 12A. This will effectively prevent sharp bending in the middle of the metal pipe 1. Alternatively, if the metal pipe 1 is connected to another member at two connections as discussed above, the high-strength portions 11A and 12A are preferably located midway between the two connections. That is, it is preferable that at least parts of the high-strength portions 11A and 12A are located midway between the two connections. This will prevent the sharp bending caused by an impact against the middle of the metal pipe 1. For example, in a metal pipe 1, sharp-bend deformation in the middle which has the largest moment associated with an impact is effectively prevented.

Figure 5A:
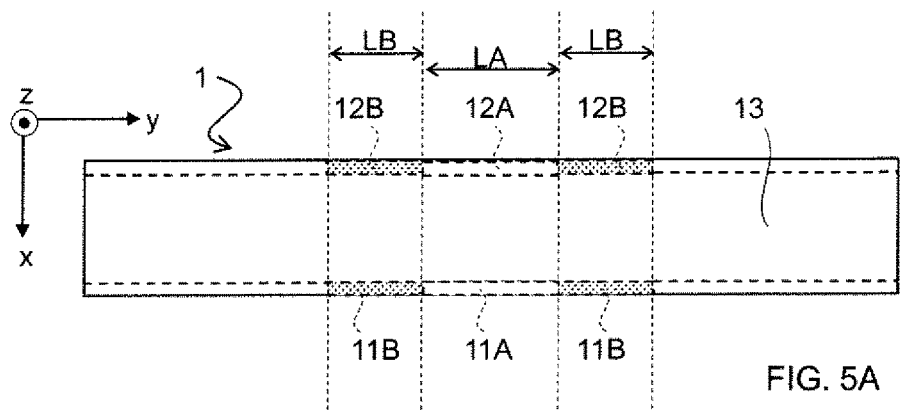
FIG. 5A is a top view of the metal pipe of FIG. 2A, as viewed in the z-direction.

FIG. 5A is a top view of the metal pipe 1 shown in FIG. 2A as viewed from above (top portion 13, in the z-direction). In FIG. 5A, the side walls 11 and 12 visible if one sees through the top portion 13 are indicated by broken lines. To prevent the metal pipe 1 from being twisted and sharply bent, as in the implementation shown in FIG. 5A, the opposite high-strength portions 11A and 12A of the pair of side walls 11 and 12 may be positioned so as to completely overlap as viewed in the direction in which these opposite portions are arranged (x-direction). That is, one entire high-strength portion 11A overlaps the other entire high-strength portion 12A as viewed in the direction in which these opposite portions are arranged. The opposite low-strength portions 11B and 12B of the pair of side walls 11 and 12 may be positioned to completely overlap as viewed in the direction in which these opposite portions are arranged (x-direction). That is, each entire low-strength portion 11B of one side wall and the corresponding entire low-strength portion 12B of the other side wall overlap each other as viewed in the direction in which these opposite portions are arranged.

As shown in FIG. 5A, the strength distribution in one side wall 11 is preferably a mirror image of the strength distribution in the other side wall 12. That is, the high-strength portion 11A or 12A and low-strength portions 11B and 12B of each of the pair of side walls 11 and 12 are preferably symmetrical with respect to the central imaginary plane of the pair of side walls 11 and 12. This will reduce the possibility of one of the side walls 11 and 12 being crushed before the other.

For example, in the implementations shown in FIGS. 2A to 2C and 5A, the pair of side walls 11 and 12 have the same height and have the same angle relative to the top portion 13. Thus, in a cross section perpendicular to the longitudinal direction, the cross-sectional shape of the metal pipe 1 is symmetrical with respect to the perpendicular bisector A of the top portion 13. Further, the strength distribution in the metal pipe 1 is symmetrical with respect to the perpendicular bisector A. This will reduce bias in stresses caused by an impact.

Figure 5B:
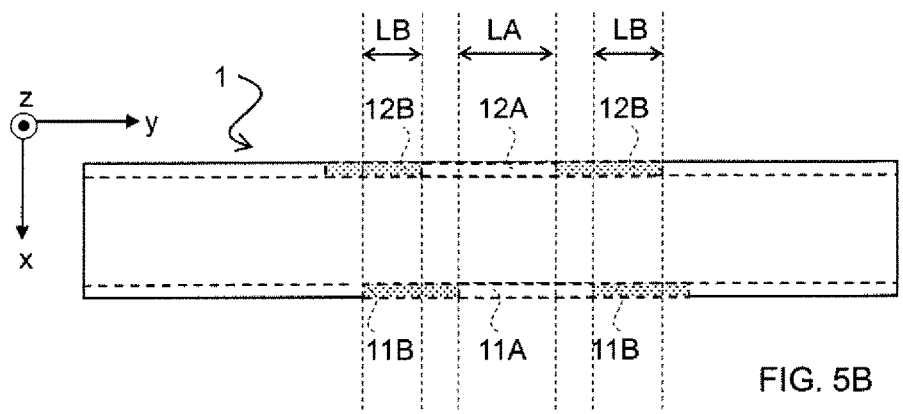
FIG. 5B shows a variation of the metal pipe of FIG. 2A with a different configuration of the high-strength portion and low-strength portions.

FIG. 5B shows a variation of the metal pipe 1 shown in FIG. 2A with a different configuration of the high-strength portions 11A and 12A and low-strength portions 11B and 12B. In the implementation shown in FIG. 5B, the opposite high-strength portions 11A and 12A of the pair of side walls 11 and 12 are arranged such that parts thereof overlap each other as viewed in the direction in which these opposite portions are arranged (x-direction). Thus, at least a portion of one high-strength portion 11A may overlap the other high-strength portion 12A as viewed in the direction in which these opposite portions are arranged. The opposite low-strength portions 11B and 12B of the pair of side walls 11 and 12 are positioned such that parts thereof overlap as viewed in the direction in which these opposite portions are arranged (x-direction). Thus, at least a portion of each low-strength portion 11B of one side wall may overlap the corresponding low-strength portion 12B of the other wall as viewed in the direction in which these opposite portions are arranged.

As shown in FIG. 5B, the longitudinal dimension of each of the portions of the high-strength portions 11A and 12A that overlap as viewed in the direction in which these opposite portions are arranged will be treated as the dimension LA of the opposite high-strength portions 11A and 12A. Similarly, the longitudinal dimension of each of the portions of the pairs of low-strength portions 11B and 12B that overlap as viewed in the direction in which the opposite portions are arranged will be treated as the dimension LB of the opposite low-strength portions 11B and 12B.

Thus, if portions of the high-strength portions 11A and 12A or portions of the low-strength portions 11B and 12B overlap as viewed in the direction in which the opposite portions are arranged, these dimensions LA and LB may be defined as the dimensions of opposite portions. The values LA and LB thus defined satisfy one of the above-mentioned relationships $((2/3)H \leq LA \leq 3 H)$, or more preferably $(H \leq LA \leq (4/3)H)$, or yet more preferably $(H \leq LA \leq (4/3)H)$ or $((3/5)H \leq LB)$.

In each of the arrangements shown in FIGS. 2A to 2C and 5A and 5B, the four plates, i.e. top portion 13, side walls 11 and 12 and bottom portion 14, correspond to the different sides of the quadrangle of a cross section. For each of these four plates, the both edges are connected to edges of adjacent plates. That is, these four plates are formed by one continuous member. For example, the four plates of the metal pipe 1 may be formed by deforming one plate. In such cases, the quadrangular pipe formed by bending one plate constitutes the metal pipe 1. The metal pipe 1 has no portion protruding outward from the outer periphery of this quadrangular pipe (such as a flange).

In the metal pipe 1, a ridge is formed along the border between the top portion 13 and each of the pair of side walls 11 and 12. Similarly, a ridge is formed along the border between the bottom portion 14 and each of the pair of side walls 11 and 12. That is, a ridge is formed between adjacent two of the four plates, i.e. top portion 13, side walls 11 and 12 and bottom portion 14. These ridges extend in the longitudinal direction. Thus, the metal pipe 1 has ridges corresponding to the corners of the quadrangle of a cross section.

In other words, the metal pipe 1 includes a top portion 13, two first ridges on both edges of the top portion 13, a bottom portion 14 opposite to the top portion 13, and two second ridges on both edges of the bottom portion 14. The metal pipe 1 further includes two side walls 11 and 12 located between the first and second ridges. The direction in which the first ridges extend will be treated as the longitudinal direction of the metal pipe 1. The direction in which the first ridges extend and the direction in which the second ridges extend may be the same or different.

A ridge increases the strength of the metal pipe 1 against an impact. The high-strength portions 11A and 12A and low-strength portions 11B and 12B are provided on the side walls 11 and 12 connected, via ridges, to the top portion 13 which may receive an impact. This will reduce the sharp-bend deformation of the metal pipe 1 caused by an impact against the top portion 13.

Figure 6:
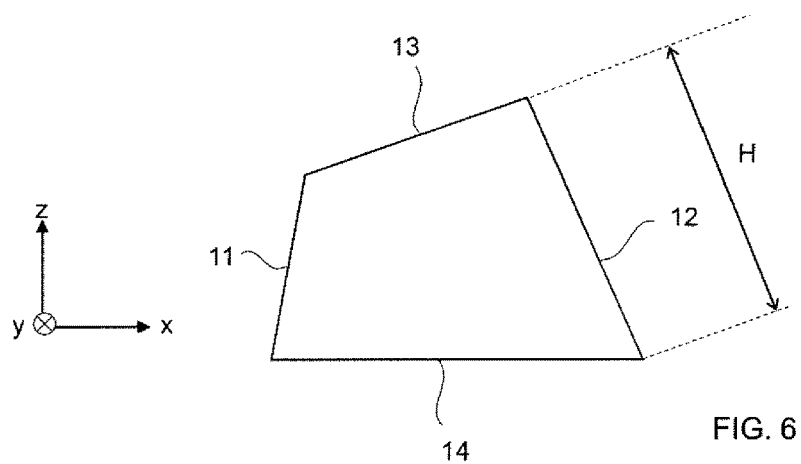
FIG. 6 is cross-sectional view of a variation of the metal pipe 1 with a different cross-sectional shape.

FIG. 6 is a cross-sectional view of a variation of the metal pipe 1 with a different cross-sectional shape. In the implementation shown in FIG. 6, the metal pipe 1 has a trapezial cross-sectional shape. In this implementation, the top and bottom sides of the trapezium are not parallel. Thus, the angle between each of the side walls 11 and 12 and bottom portion 14 and/or the angle between each of the side walls 11 and 12 and top portion 13 may not be 90 degrees (quadrangular). That is, a cross-sectional shape of the metal pipe 1 may be a rectangle or square, or a trapezium, parallelogram or any other quadrangle.

In the arrangement shown in FIG. 6, the pair of side walls 11 and 12 have different heights. In such cases, the height H of the side walls is defined as the height of the higher side wall. Here, the height H of the side walls is defined as the dimension of the side walls as measured in the direction perpendicular to the top portion 13. That is, the height of the side walls 11 and 12 is defined as the dimension of the side walls 11 and 12 as measured in the direction perpendicular to the face between the side walls 11 and 12 that is expected to receive an impact. The definition of the height H of the side walls is the same in other embodiments.

Figure 7:
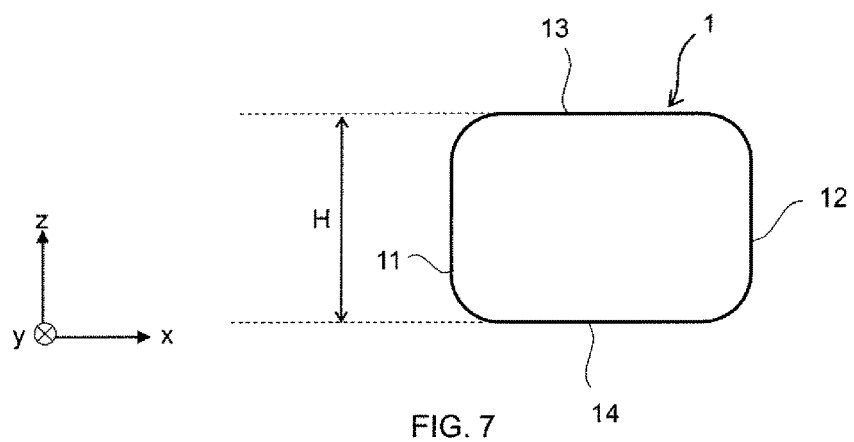
FIG. 7 is a cross-sectional view of another variation of the metal pipe with a different cross-sectional shape.

FIG. 7 is a cross section of another variation of the metal pipe with yet another cross-sectional shape. As shown in FIG. 7, the corners that form the borders between the side walls 11 and 12 and top portion 13 (i.e. shoulders) may be curved (R, rounded portions). Similarly, the corners that form the borders between the side walls 11 and 12 and bottom portion 14 (i.e. shoulder) may be curved (R, rounded portions).

If the corners forming the borders between the side walls 11 and 12 and top portion 13 or the corners forming the borders between the side walls 11 and 12 and bottom portion 14 are curved (R, rounded portions), then, the curved portions (R, rounded portions) are treated as being included in the side walls 11 and 12 to determine the height H of the side walls 11 and 12. In the implementation shown in FIG. 7, the curved portions (R) along the corners between the side walls 11 and 12 and top portion 13 and the curved portions (R) along the corners between the side walls 11 and 12 and bottom portion 14 are treated as portions of the side walls 11 and 12 to determine the height H of the side walls 11 and 12.

Although not shown, at least one of the top portion 13, side walls 11 and 12 and bottom portion 14 may be a curved face rather than a flat face. That is, at least one of the top portion 13, side walls 11 and 12 and bottom portion 14 may be curved.

Figure 8:
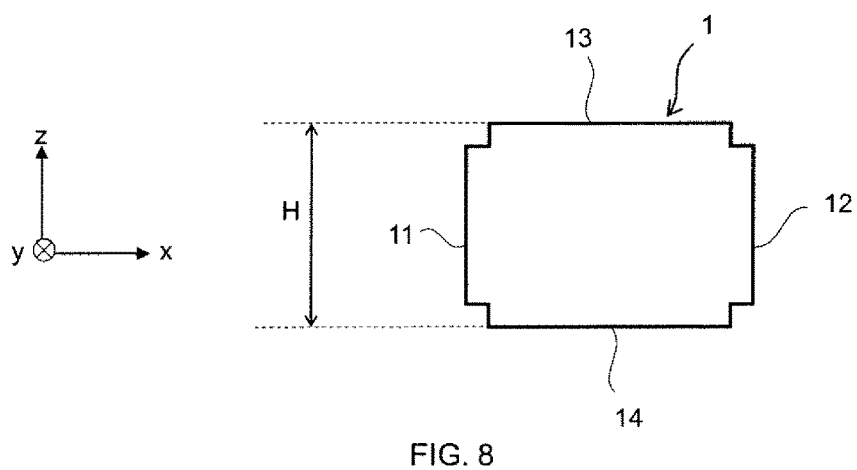
FIG. 8 is a cross-sectional view of yet another variation of the metal pipe with a different cross-sectional shape.

FIG. 8 is a cross-sectional view of yet another variation of the metal pipe with a different cross-sectional shape. In the implementation shown in FIG. 8, a recess (or groove) is formed on each of the two edges of each of the side walls 11 and 12. Thus, grooves extending in the longitudinal direction are formed along the ridges between the side walls 11 and 12 and top portion 13 and the ridges between the side walls 11 and 12 and bottom portion 14. Thus, recesses, protrusions, steps or holes (hereinafter referred to as "recesses etc.") may be formed on the side walls 11 and 12. Similarly, recesses etc. may be formed on the top portion 13 and/or bottom portion 14.

If recesses etc. are formed on the edges of the side walls 11 and 12 as shown in FIG. 8, the recesses are treated as being included in the side walls 11 and 12 to determine the height H of the side walls 11 and 12. In the implementation shown in FIG. 8, the height H of the side walls is defined as the height of the side walls 11 and 12 including the recesses on both edges.

In the implementation shown in FIGS. 2A to 2C, the metal pipe 1 extends straight in the longitudinal direction. Alternatively, the metal pipe 1 may be curved. For example, the metal pipe 1 may be curved to be convex on the top portion 13.

Figure 9A:
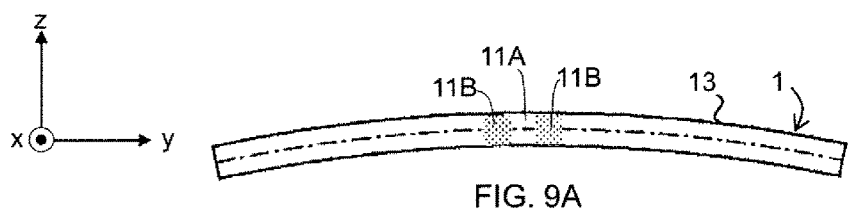
FIG. 9A is a side view of an exemplary curved metal pipe.
Figure 9B:
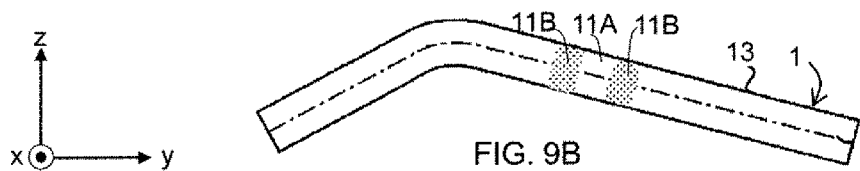
FIG. 9B is a side view of another exemplary curved metal pipe.
Figure 9C:
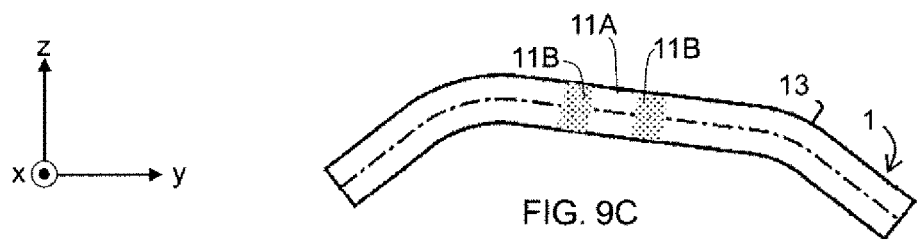
FIG. 9C is a side view of yet another exemplary curved metal pipe.
Figure 9D:
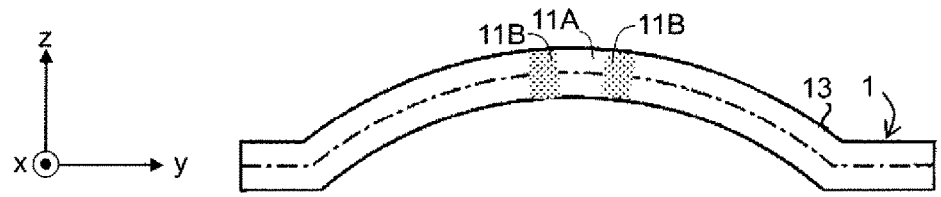
FIG. 9D is a side view of still another exemplary curved metal pipe.

FIGS. 9A to 9D are side views of example implementations of the metal pipe 1 that are curved along the longitudinal direction. In the implementations shown in FIGS. 9A to 9D, the metal pipe 1 is curved to be convex on the top portion 13. In FIG. 9A, the metal pipe 1 is curved with a constant curvature along the entire length. In FIGS. 9B and 9C, the curvature varies depending on the position as determined along the longitudinal direction of the metal pipe 1. In FIG. 9D, a longitudinal section of the metal pipe 1 is curved. In the implementations shown in FIGS. 9A and 9D, the metal pipe 1 is curved so as to be left-right symmetrical as viewed in a direction perpendicular to the side walls 11 and 12 (x-direction). In FIGS. 9B, 9C and 9D, the metal pipe 1 includes a portion that is curved (i.e. curved portion) and a portion extending along a straight line (i.e. straight portion). In the implementation shown in FIG. 9C, curved portions are positioned on both ends of the straight portion as determined along the longitudinal direction. That is, a straight portion is positioned between the curved portions. In the implementation shown in FIG. 9D, straight portions are positioned on both ends of the curved portion as determined along the longitudinal direction.

Curving the metal pipe 1 as discussed above, improves the impact resistance to an impact in the direction opposite to the convex-direction of the curve. For example, a structural member including a curved metal pipe 1 with its both ends supported has a high impact resistance to an impact in the direction opposite to the convex-direction of the curve.

In the implementations shown in FIGS. 9A and 9D, the pair of low-strength portions 11B of a side wall 11 and a high-strength portion 11A therebetween are located in the curved portion of the metal pipe 1. In the implementations shown in FIGS. 9B and 9C, the pair of low-strength portions 11B of a side wall 11 and the high-strength portion 11A therebetween are located in the straight portion of the metal pipe 1. When the low-strength portions 11B and high-strength portion 11A are located in the straight portion, the high-strength portion 11A may be located in the middle of the straight portion, for example. Thus, the high-strength portion 11A is located in a portion where a high moment is caused by a received impact.

[Applications in Vehicles]

If the metal pipe 1 is used as a structural member for a vehicle as discussed above, the metal pipe 1 may be supported by two connections separated in the longitudinal direction of the metal pipe 1 and, with this condition kept, may be attached to the vehicle. The metal pipe 1 may serve as a structural member in a vehicle body, a bumper or a vehicle door, for example. Thus, a vehicle body, bumper or vehicle door including the metal pipe 1 is included in the embodiments of the present invention.

In one side wall 11 of a metal pipe 1 supported at two connections, a pair of low-strength portions 11B separated in the longitudinal direction and a high-strength portion 11A therebetween may be positioned between the two connections. Similarly, a high-strength portion 12A and low-strength portions 12B may be provided in the other side wall 12 opposite to the one side wall 11. This prevents sharp bending of portions of the metal pipe 1 where a large moment is generated when an impact has been applied. This will provide a structural member with high impact resistance.

For example, the high-strength portions 11A may be positioned at the position that is equally distant from the two connections (i.e. located midway between the two connections). For example, a structural member including a metal pipe 1 having high-strength portions 11A in the middle along the longitudinal direction may be provided, with its both ends supported. "Both ends" as used herein means both ends of the metal pipe 1 and portions near them.

If a metal pipe 1 is mounted on the vehicle, the metal pipe 1 may be positioned such that the longitudinal profile of the metal pipe 1 extends along the outer shape of the vehicle. That is, the metal pipe 1 is mounted such that an impact derived from a crash of the vehicle is in a direction perpendicular to the longitudinal direction of the metal pipe 1. Further, the metal pipe 1 is mounted on the vehicle such that the top portion 13 is located on the outside of the vehicle and the bottom portion 14 is located toward the interior of the vehicle. In such cases, high-strength portions 11A are positioned between the connections, i.e. in the middle of the metal pipe 1, and low-strength portions 11B are positioned to sandwich them. As such, when the metal pipe 1 receives an impact from outside the vehicle, the metal pipe 1 protrudes inwardly of the vehicle to a smaller extent. This will further reduce the possibility of the metal pipe 1 contacting a device or person in the vehicle. For example, upon a crash, the metal pipe 1 is prevented from being sharply bent toward the interior of the passenger cabin. This will further improve safety.

The metal pipe 1 may be curved, as discussed above. In such cases, the metal pipe may be mounted on the vehicle to be convex toward the outside of the vehicle. In such implementations, the metal pipe 1 is curved to be convex toward the outside of the vehicle. Thus, when the metal pipe 1 receives an impact from the outside of the vehicle, the pipe is less likely to be bent sharply.

The metal pipe 1 may serve as a structural member constituting part of a vehicle body, a bumper or a vehicle door. For example, the metal pipe 1 may be used in a member constituting part of the vehicle body, such as an A-pillar, a B-pillar, a side sill, a roof rail, a floor member, and a front side member. Alternatively, the metal pipe 1 may be used in a member to be mounted on the vehicle body, such as a door impact beam or a bumper, to protect devices or passengers in the vehicle from an impact from the outside.

Figure 10A:
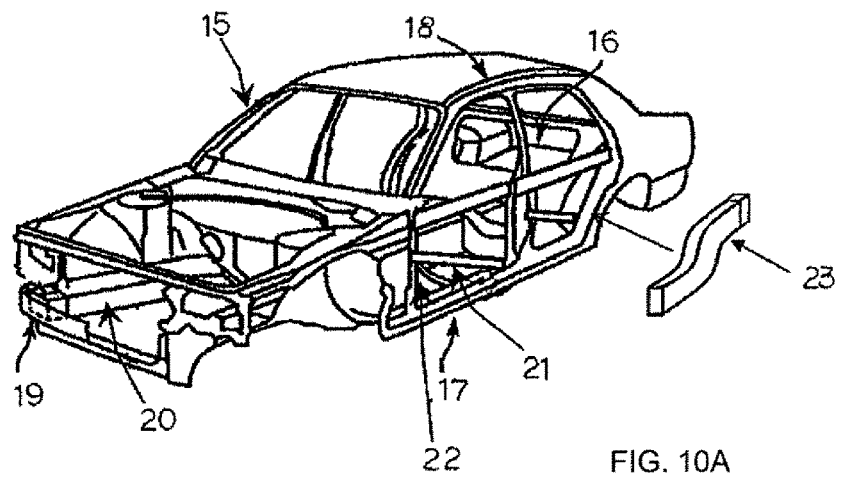
FIG. 10A shows an exemplary structural member mounted on a vehicle.

FIG. 10A shows an exemplary structural member mounted on a vehicle that uses a monocoque structure. In the implementation shown in FIG. 10A, an A-pillar 15, a B-pillar 16, a side sill 17, a roof rail 18, a bumper 19, a floor side member 20, a door impact beam 21, a floor member 22 and a rear side member 23 are used as vehicle structural members. At least one of these vehicle structural members may be constituted by the metal pipe 1 discussed above.

If the bumper 19 is formed by the metal pipe 1, the metal pipe 1 may be constructed such that its both ends are supported by the front side member 20. In this construction, the moment from a load is at its maximum when an impact is applied to the middle of the bumper 19. High-strength portions 11A and 12A are positioned in the middle of the bumper 19 as determined along its left-right direction, and low-strength portions 11B and 12B are positioned to sandwich them. This will prevent the bumper 19 from being bent sharply by an impact on the middle of the bumper.

If the door impact beam 21 is formed by the metal pipe 1, brackets may be provided on both ends of the metal pipe 1. The metal pipe 1 is mounted on the door frame using the brackets on both ends. In such cases, too, the high-strength portions 11A and 12A may be positioned in the middle of the metal pipe. That is, the high-strength portions 11A and 12A may be positioned in the middle of the metal pipe 1 forming the door impact beam 21, i.e. between the ends of the pipe, which serve as coupling portions. This will prevent sharp bending of portions where the largest moment is generated upon reception of an impact.

Figure 10B:
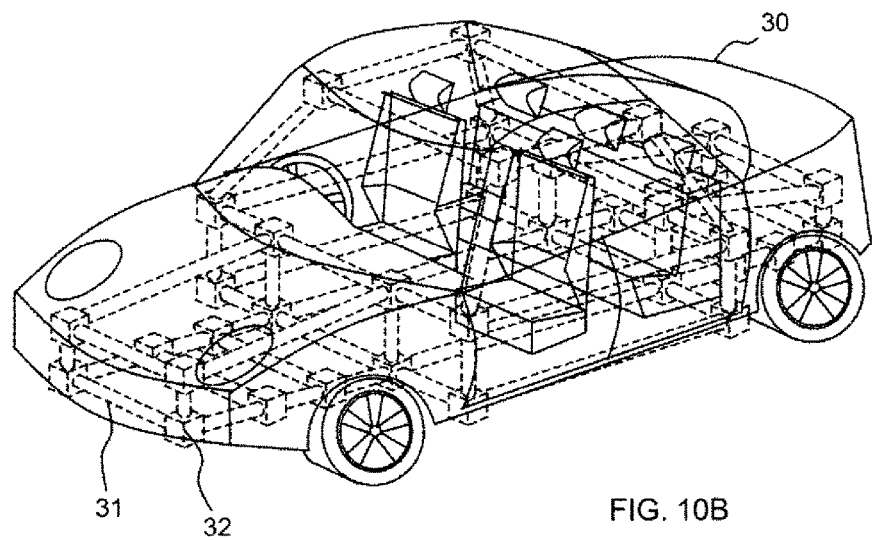
FIG. 10B shows an exemplary vehicle including a vehicle body with a space-frame structure.

The metal pipe 1 may be applied to not only vehicles using a monocoque structure, but also vehicles using a frame structure. FIG. 10B shows the vehicle including a vehicle body with a space-frame structure disclosed in JP 2011-37313 A. The vehicle body with a space-frame structure includes a plurality of pipes 31 and a joint 32 coupling the pipes 31. The pipes 31 are positioned inside a body shell 30, which covers the exterior of the vehicle body. The pipes 31 includes pipes extending in the top-bottom direction, pipes extending in the front-rear direction, and pipes extending in the left-right direction. At least some of the pipes 31 may each be formed by the metal pipe 1 discussed above. Applying the metal pipe 1 discussed above as a pipe (or tube) constituting part of a vehicle with a space-frame structure is effective as the pipe cannot be bent deeply into the interior of the vehicle body, in which a passenger or an engine is positioned.

The above-discussed effects are significant when the metal pipe 11B or 12B constituting a structural member of a vehicle is made of an ultrahigh strength steel with a tensile strength (i.e. tensile strength of the portions other than the low-strength portions 11B and 12B) not less than 780 MPa (or a yield strength not less than 400 MPa). The effects are still more significant when the portions of the metal pipe 1 other than the low-strength portions 11B and 12B has a strength represented by a tensile strength not less than 980 MPa (or yield strength not less than 500 MPa).

The metal pipe 1 may be used as various vehicle structural members and is not limited to four-wheel vehicles, such as the automobiles shown in FIGS. 10A and 10B, but may also be used as a structural member of a two-wheel vehicle, for example. Applications of a structural member constituted by the metal pipe 1 are not limited to vehicles. For example, the metal pipe 1 may be used as a structural member of an impact-resistant container, a building, a ship, an airplane, or the like.

The manners in which the metal pipe 1 is used as a structural member are not limited to implementations where both ends of the metal pipe 1 are connected to another member. Another member may be connected to arbitrary two positions on the metal pipe 1 that are distant by 6 H or more in the longitudinal direction. That is, the two connections may be disposed at arbitrary positions on the metal pipe 1, which are not limited to both ends of the pipe.

[Manufacturing Process]

The metal pipe 1 may be entirely formed from the same material. The metal pipe 1 may be formed from a metal plate. For example, one steel plate may be bent and one edge of the steel plate may be joined to the opposite edge by welding, for example, to form a tubular structural member with a quadrangular cross section (i.e. quadrangular pipe). Alternatively, a solid quadrangular column may be pierced to form an axial bore to form the metal pipe 1. If a quadrangular pipe is to be curved, for example, bending methods may be used such as press bending, stretch bending, compression bending, roll bending, MOS bending or eccentric plug bending.

The process for manufacturing the metal pipe 1 includes the step of forming the low-strength portions in a material. The method of forming the low-strength portions is not limited to any particular one; for example, a material may be locally heated and quenched by a method such as a laser method or high-frequency heating to create a metal pipe 1 including hardened portions. In such cases, the portions that have not been quenched provide low-strength portions with relatively low strength. Alternatively, thermal refining may be performed to strengthen an entire quadrangular pipe, which is then locally annealed to form low-strength portions.

Alternatively, a tubular member may be moved in an axial direction to successively perform the steps of heating, providing a bending moment and cooling to produce a metal pipe 1 that is curved along the longitudinal direction. During this method, an induction heating coil is disposed around a tubular member, which is locally heated to temperatures that allow plastic deformation. The heated portion is moved in a tube direction and, with the portion kept hot, a movable grasping means such as a movable roller dice positioned on the tubular member downstream of the induction heating coil is moved to provide a bending moment. The portion that has been bent in this manner is cooled by a cooling device located between the induction heating coil and movable grasping means. During this process, for example, conditions for heating and cooling may vary on the periphery of the tubular member to form low-strength portions in the tubular member.

The metal pipe 1 may be manufactured by other methods. Tailored blank or other known methods may be used to form the metal pipe 1 with low-strength portions.

In the metal pipe 1 discussed above, the distribution of yield strength in the high-strength portions 11A and 12A may not be uniform. In a stationary range, the variation in yield strength is normally within ±10%. In view of this, 90% of the maximum, Smax, of yield strength in the high-strength portions 11A and 12A defines the yield strength (or reference strength) of the high-strength portion 11A or 12A, SA (SA=0.9 Smax). The range of yield strengths larger than 0.85 SA and smaller than 0.9 SA (i.e. 85% to 90% of SA) (transitional range) is deemed to be part of the high-strength portion 11A or 12A. Yield strength in the high-strength portions 11A and 12A is larger than 0.85 SA (i.e. 85% of SA). That is, the range of yield strengths larger than 0.85 SA represents the high-strength portion 11A or 12A.

Figure 11:
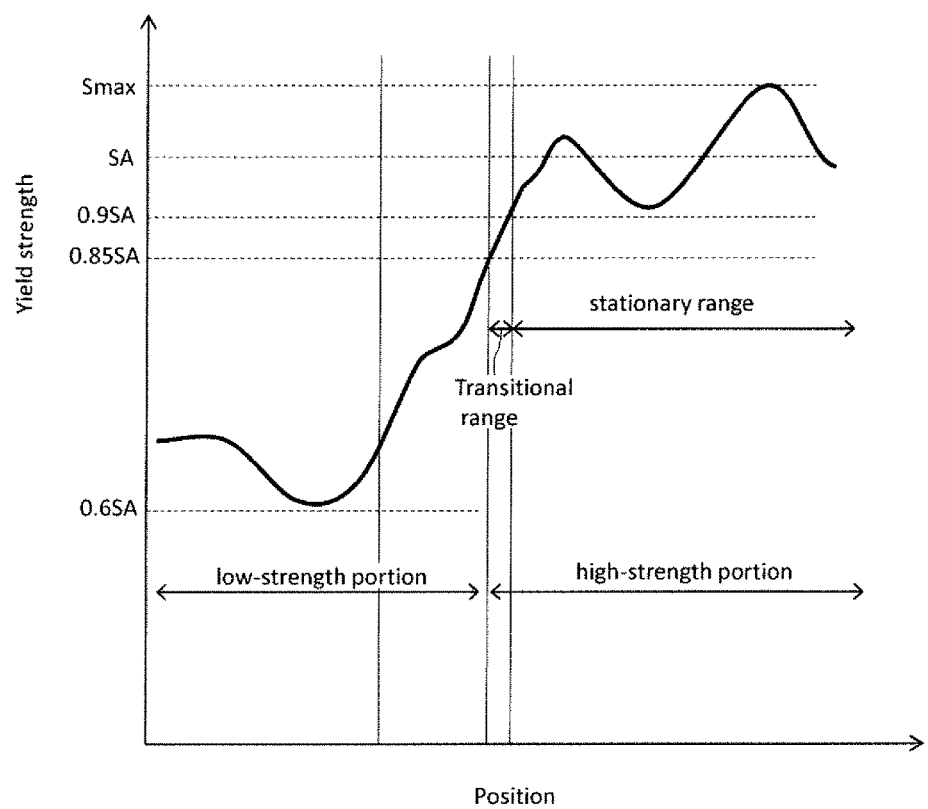
FIG. 11 shows an exemplary distribution of yield strength in a portion of the metal pipe including the border between a low-strength portion and the high-strength portion.

FIG. 11 shows an example of the distribution of yield strength in a portion of the pipe including the border between a low-strength portion 11B or 12B and a high-strength portion 11A or 12A. In FIG. 11, the longitudinal axis represents yield strength, while the horizontal axis represents the position in the y-direction. In the example of FIG. 11, 90% of the maximum Smax of yield strength in the high-strength portion (0.9 Smax) defines the yield strength SA of the high-strength portion. In the high-strength portion, the range of yield strengths not less than 0.9 SA is referred to as constant range. Further, the range of yield strengths more than 0.85 SA and less than 0.9 SA is the transitional range, which stretches between the low-strength portion and the constant range of the high-strength portion. The transitional range is deemed to be included in the high-strength portion. That is, the position of the yield strength of 0.85 A represents the border between the low-strength portion and high-strength portion. That is, the range of yield strengths more than 0.85 SA forms the high-strength portion, while the range of yield strengths not more than 0.85 SA forms the low-strength portion.

The yield strength of the low-strength portion is not less than 0.6 SA and not more than 0.85 SA (60 to 85% of SA). Even if the metal pipe 1 includes some portions surrounded by a low-strength portion and having a strength not more than 0.6 SA, they are deemed to be part of the low-strength portion 11B or 12B if they are small enough that their influence on the deformation behavior of the metal pipe 1 is negligible.

EXAMPLES

Figure 12A:
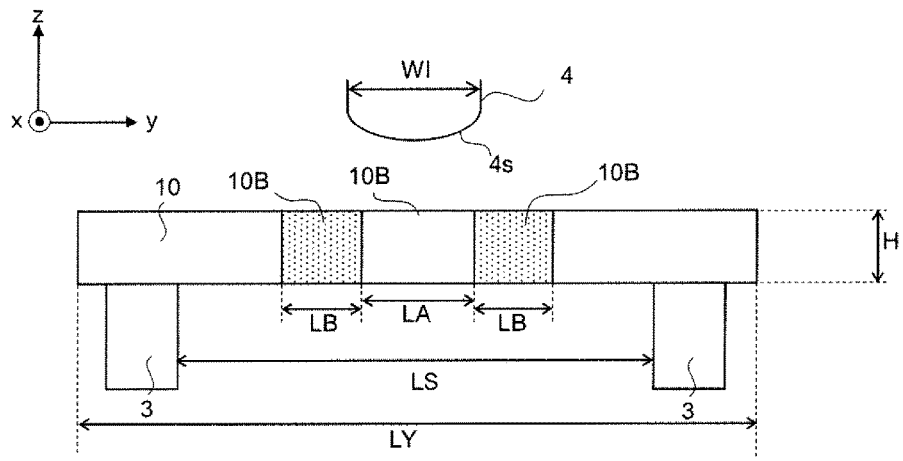
FIG. 12A shows an analysis model in a simulation.

The present examples used simulations to analyze the deformation of metal pipes with quadrangular cross sections occurring when an indenter was caused to hit the metal pipes. FIG. 12A shows the configuration of an analysis model in the simulations. In the present simulation, a metal pipe 10 was placed on two stands 3 so as to stretch over and between them and, with this condition kept, an indenter (impactor) 4 was caused to hit the middle of the metal pipe 10 as determined along its longitudinal direction, and the deformation behavior was analyzed.

The mass of the indenter 4 was 350 kg; the width WI of the indenter 4 as measured in the y-direction was 160 mm; the radius of curvature R of the impact surface 4s of the indenter 4 was 150 mm; and the initial speed of the indenter 4 was 4 m/sec. The coefficient of friction was 0.1. The metal pipe 10 had a square cross section with sides each having a length of 50 mm. The height H of the metal pipe 10 was 50 mm, the plate thickness of the metal pipe 10 was 1.4 mm, the value R of the metal pipe 10 was 5 mm, and the length LY of the metal pipe 10 was 1000 mm. The distance LS between the stands 3 was 400 mm.

Each of a pair of side walls connected to both edges of the top portion, which included a face to which the indenter 4 was caused to hit, included a high-strength portion 10A and low-strength portions 10B sandwiching the high-strength portion. The high-strength portion 10A was located in the middle of the metal pipe 10 as determined along the length direction. That is, the metal pipe 10 was a quadrangular pipe having a quadrangular cross section. The metal pipe 10 included a pair of opposite side walls, a top portion connected to the top edges of the side walls, and a bottom portion connected to the lower edges of the side walls. The indenter 4 was caused to hit the top portion. The length LY of the metal pipe 10 was six times the height H of the side walls or larger (LY≥6 H).

Figure 12B:
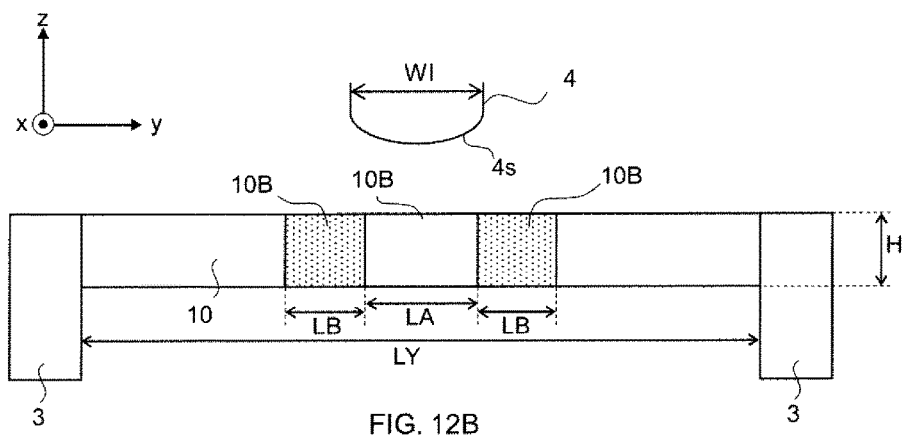
FIG. 12B shows an analysis model in another simulation.

FIG. 12B shows the configuration of another analysis model in the simulations. In the example of FIG. 12B, both ends of the metal pipe 10 were joined to the two stands 3. The results of the simulation of the analysis model of FIG. 11B were similar to those of the simulation of the analysis model of FIG. 12A.

Impact simulations were conducted where the yield strength of the low-strength portions 10B was 100 kgf/mm$^2$, and the yield strength of the other portions including the high-strength portion 10A was 120 kgf/mm$^2$ (the strength ratio of low-strength portions 10B relative to the high-strength portion 10A being about 0.83), with different sizes LA of the high-strength portion 10A and different sizes LB of the low-strength portions 10B.

Table 1 given below shows deformation behavior values obtained from the simulation results where the strength ratio discussed above was 0.83 (the yield strength of the low-strength portions 10B being YP 100 kgf/mm$^2$ and the yield strength of the other portions including the high-strength portions 10A being YP 120 kgf/mm$^2$), with different sizes LA of the high-strength portions 10A and different plate thicknesses t of the metal pipe 10. In Table 1, "Excellent" in the column labeled "Deformation behavior" means very good behavior, "Good" means good behavior, and "Poor" means poor behavior. These evaluations of deformation behaviors were made based on the amount of intrusion by the indenter found when sharp bending occurred. The amount of intrusion by the indenter may also be referred to as impacter stroke or indenter displacement.

TABLE 1

| Case | LA | t [mm] | Deformation behavior |
|---|---|---|---|
| 1 | O | 1.4 | Poor |
| 2 | 2H/3 | 1.4 | Good |
| 3 | H | 1.4 | Excellent |
| 4 | 4H/3 | 1.4 | Excellent |
| 5 | 2H | 1.4 | Good |
| 6 | 8H/3 | 1.4 | Good |
| 7 | 3H | 1.4 | Good |
| 8 | 10H/3 | 1.4 | Poor |
| 9 | 4H | 1.4 | Poor |
| 10 | 2H | 1.0 | Good |
| 11 (=5) | 2H | 1.4 | Good |
| 12 | 2H | 1.8 | Good |

Figure 13:
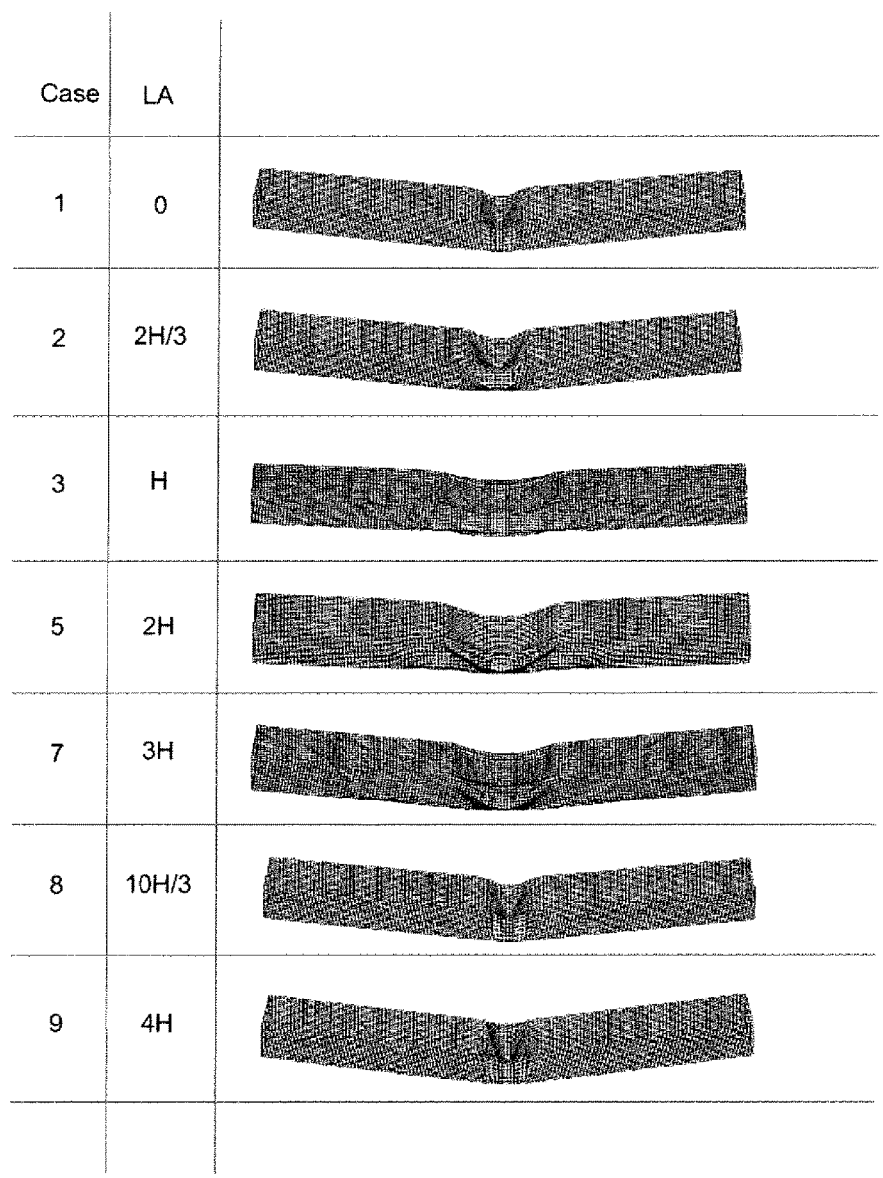
FIG. 13 shows a result of a simulation of the deformation of a metal pipe.

FIG. 13 shows the results of the simulations of how the metal pipe 10 deformed when the amount of intrusion by the indenter 4 was 40 mm. FIG. 13 shows how the metal pipe 10 deformed for each of Cases 1 to 3, 5 and 7 to 9 shown in Table 1. The results shown in FIG. 13 show that the range of the portion deformed by an impact for each of Cases 2, 3, 5 and 7, i.e. 2H/3≤LA≤3 H, was wider than that for each of the other cases, i.e. Cases 1, 8 and 9. That is, in Cases 1, 8 and 9, a deformation mode referred to as "sharp-bending mode" occurred, where the bent portion protruded sharply.

In Cases 2, 3, 5 and 7, a deformation mode referred to as "cross-section crush" occurred, where the top portion, which received an impact, and portions of the side walls were crushed by an impact.

Figure 14:
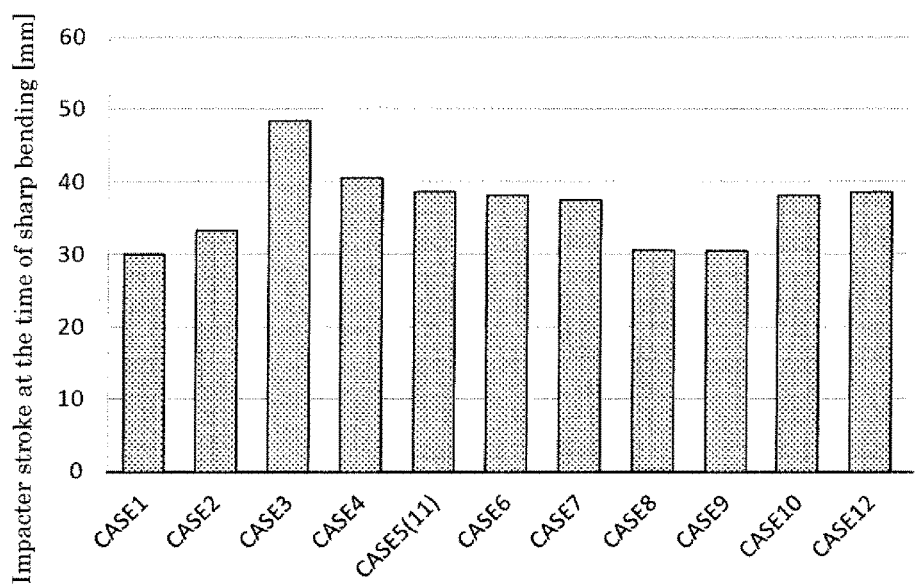
FIG. 14 is a graph showing results of simulations of the impacter stroke found when a sharp bend occurs.

FIG. 14 is a graph showing the results of the simulations of the impacter stroke at the time of sharp bending for Cases 1 to 12 in Table 1. In the results shown in FIG. 14, the impacter stroke at the time of sharp bending is larger for Cases 2 to 7 and 10 to 12 than for Case 1, i.e., when no low-strength portions 10B are provided. This shows that sharp bending is less likely to occur for Cases 2 to 7 and 10 to 12 than when no low-strength portions 10B are provided. Further, the impacter stroke at the time of sharp bending is higher for Cases 3 to 7, i.e. when H≤LA≤3 H, than in other cases. This shows that sharp bending is particularly unlikely to occur for Cases 3 to 7. Further, for Cases 3 and 4, i.e. where H≤LA≤4H/3, the impacter stroke is prominently high, further preventing sharp bending.

Figure 15:
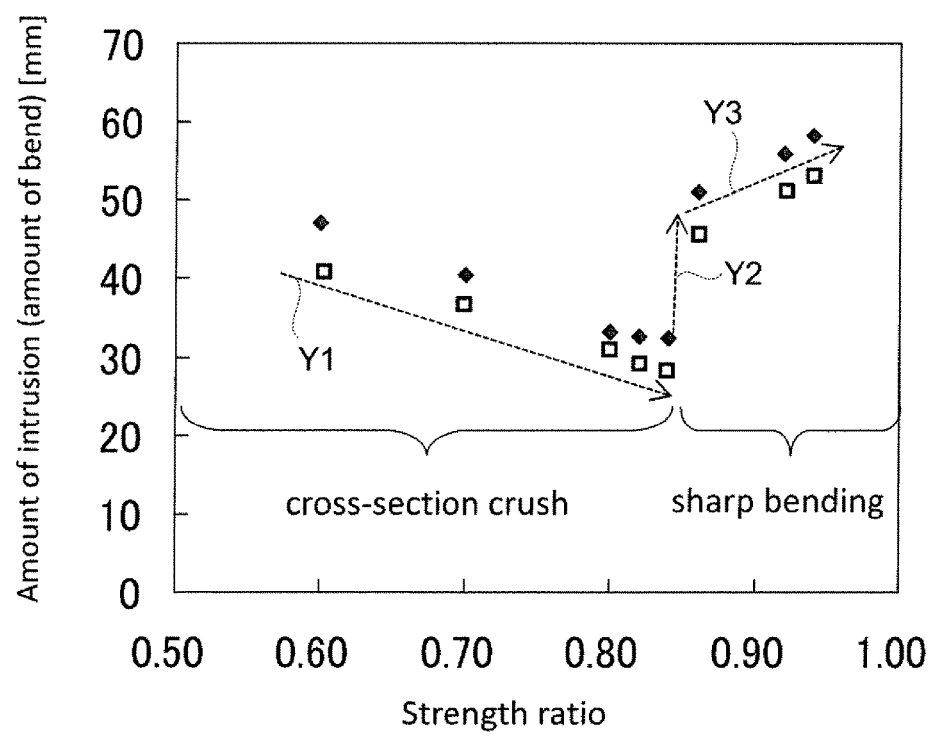
FIG. 15 is a graph showing the amount of deformation due to bend deformation found when an impact load is input with different strength ratios between the low-strength portions and high-strength portion.

Impact simulations were conducted with different ratios between the strength of the low-strength portions 10B and the strength of the other portions including the high-strength portion 10A. FIG. 15 is a graph showing the amount of deformation associated with the bending deformation found when impact loads were input with different strength ratios between the low-strength portion 10B and the other portions including the high-strength portion 10A. In FIG. 15, the vertical axis indicates the amount of intrusion in (or amount of protrusion of) the metal pipe 10 as measured in the direction of impact (z-direction). The horizontal axis indicates the ratio of the strength of the low-strength portions 10B to the strength of the high-strength portion 10A (strength ratio=strength of low-strength portions/strength of high-strength portion). In the graph of FIG. 15, the plotted rhombuses indicate results obtained when the yield strength of the high-strength portion was YS 120 kgf·mm$^2$, while the plotted quadrangles indicates results obtained when the yield strength of the high-strength portion was 145 kgf/mm$^2$.

In the section with strength ratios of 0.60 to 0.85, the amount of intrusion decreased as strength ratio increased (arrow Y1). In this section, the deformation mode of the metal pipe 10 was cross-section crush. Within this section, when the strength of the low-strength portions 10B was low (strength ratio was not higher than 0.60), the deformation was cross-section crush but with a large amount of intrusion, substantially equal to the amounts of intrusion for strength ratios of 0.85 and higher. When strength ratio exceeded 0.85, the amount of intrusion rapidly increased (arrow Y2). Further, when strength ratio increased in the section of strength ratios of 0.85 and higher, the amount of intrusion increased as strength ratio increased (arrow Y3). This is presumably because, at the border strength ratio of 0.85, the deformation mode transitioned from cross-section crush to sharp bending. Thus, when the strength of the low-strength portions 10B was too high (i.e. strength ratio was high), the pipe was deformed with sharp bending, resulting in large amounts of intrusion. The results shown in FIG. 15 confirm that, to reduce the amount of intrusion associated with the sharp bending caused by an impact, strength ratio is preferably 60 to 85%, and more preferably 70 to 85%.

Although an embodiment of the present invention has been described, the above-described embodiment is merely an example for carrying out the invention. Accordingly, the present invention is not limited to the above-described embodiment, and the embodiment may be modified appropriately without departing from the spirit of the invention.

The metal pipe of the present invention may be suitably used in various fields in the form of a steel pipe; however, the metal pipe is not limited to a steel pipe, and may be an aluminum pipe or other metal pipes.

EXPLANATION OF CHARACTERS

1: metal pipe
11, 12: side walls
13: top portion
14: bottom portion
11A, 12A: high-strength portions
11B, 12A: low-strength portions

The invention claimed is:

1. A metal pipe comprising a quadrangular cross section and further comprising:
a pair of side walls facing each other;
a top portion connected to an upper edge of each of the pair of side walls; and
a bottom portion connected to a lower edge of each of the pair of side walls,
the metal pipe having a dimension six times a height H of a higher one of the pair of side walls or more as measured in a longitudinal direction of the metal pipe,
each of the pair of side walls including:
a high-strength portion having a dimension not less than ⅔H and not more than 3H as measured in the longitudinal direction of the metal pipe, the high-strength portions forming opposite portions of the pair of side walls, each high-strength portion having a yield strength not less than 500 MPa, and
a pair of low-strength portions sandwiching each of the high-strength portions as determined along the longitudinal direction of the metal pipe, each of the pair of low-strength portions having a yield strength of 60 to 85% of that of the high-strength portion, wherein a dimension of each of the low-strength portions as measured in the longitudinal direction of the metal pipe is 3/5H or more.

2. The metal pipe according to claim 1, wherein each of the high-strength portions is located in a middle of the metal pipe as measured in the longitudinal direction of the metal pipe.

3. The metal pipe according to claim 2, wherein the metal pipe is curved to protrude on the top portion.

4. The metal pipe according to claim 1, wherein the metal pipe is curved to protrude on the top portion.

5. A vehicle comprising:
a structural member comprising a metal pipe with a quadrangular cross section, the metal pipe further comprising:
a pair of side walls facing each other;
a top portion being connected to an upper edge of each of the pair of side walls and located on an outside of the vehicle; and
a bottom portion being connected to a lower edge of each of the pair of side walls and located toward an interior of the vehicle,
wherein at least one of the side walls, top portion and bottom portion includes two connections to be joined to another member, the connections being separated by a distance six times a height H of a higher one of the pair of side walls or more as measured in a longitudinal direction of the metal pipe,
each of the pair of side walls includes:
a high-strength portion located between the connections and having a dimension not less than ⅔H and not more than 3H as measured in the longitudinal direction of the metal pipe, the high-strength portions forming opposite portions of the pair of side walls, each high-strength portion having a yield strength not less than 500 MPa, and
a pair of low-strength portions located between the connections and sandwiching each of the high-strength portions as determined along the longitudinal direction of the metal pipe, each of the pair of low-strength portions having a yield strength of 60 to 85% of that of the high-strength portion, wherein a dimension of each of the low-strength portions of the metal pipe as measured in the longitudinal direction of the metal pipe is 3/5H or more.

6. The vehicle according to claim 5, wherein each of the high-strength portions of the metal pipe is located midway between the two connections.

7. The vehicle according to claim 6, wherein the metal pipe is curved to protrude on the top portion.

8. The vehicle according to claim 5, wherein the metal pipe is curved to protrude on the top portion.

9. The vehicle according to claim 5, wherein the vehicle structural member forms part of a vehicle body of the vehicle, and the vehicle body has a space-frame structure.

* * * * *